United States Patent [19]
Reinartz et al.

[11] Patent Number: 4,805,966
[45] Date of Patent: Feb. 21, 1989

[54] SLIP-CONTROL HYDRAULIC BRAKE BOOSTER WITH BRAKING-PRESSURE RESPONSIVE VALVE FOR FAST-FILL CYLINDER

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 30,145

[22] Filed: Mar. 25, 1987

[30] Foreign Application Priority Data

Mar. 27, 1986 [DE] Fed. Rep. of Germany ....... 3610352

[51] Int. Cl.⁴ .......................... B60T 8/44; B60T 15/40
[52] U.S. Cl. ..................................... 303/114; 303/119; 60/563; 60/576
[58] Field of Search ...................... 60/547.1, 549, 560, 60/563, 565–566, 574, 576, 578, 577, 567; 303/114, 119

[56] References Cited

U.S. PATENT DOCUMENTS

| | | | |
|---|---|---|---|
| 4,483,144 | 11/1984 | Steffes | 60/566 X |
| 4,578,951 | 4/1986 | Belart et al. | 60/563 X |
| 4,641,894 | 2/1987 | Belart | 60/560 X |
| 4,671,066 | 6/1987 | Belart | 60/574 X |
| 4,678,243 | 7/1987 | Leiber | 303/114 X |
| 4,702,530 | 10/1987 | Belart et al. | 60/578 X |
| 4,708,405 | 11/1987 | Belart et al. | 60/547.1 X |
| 4,729,609 | 3/1988 | Seibert et al. | 303/114 |
| 4,730,877 | 3/1988 | Seibert et al. | 303/119 X |
| 4,754,605 | 7/1988 | Seibert et al. | 60/578 |

Primary Examiner—Robert E. Garrett
Assistant Examiner—George Kapsalas
Attorney, Agent, or Firm—James B. Raden

[57] ABSTRACT

A hydraulic brake system includes a hydraulic power booster (11) and a master cylinder (12) connected downstream of the power booster (11). The pressure chamber (21) of the power booster (11) is pressurized by an auxiliary pressure which is dependent on the position of a pedal-actuated brake valve (19). A fast-fill cylinder (40) is can be pressurized by the dynamic pressure and with its aid the working chamber (16) of the master cylinder (12) can be supplied with additional pressure fluid in the initial phase of braking. The chamber (48) between the two piston steps (57, 58) of the fast-fill cylinder connects to the unpressurized supply reservoir (3) by way of a valve assembly (51) for synchronizing the movements of the master cylinder piston (43) and of the stepped piston (45) of the fast-fill cylinder (40). The valve assembly (51) is furnished with the wheel cylinder pressure as a control variable.

6 Claims, 1 Drawing Sheet

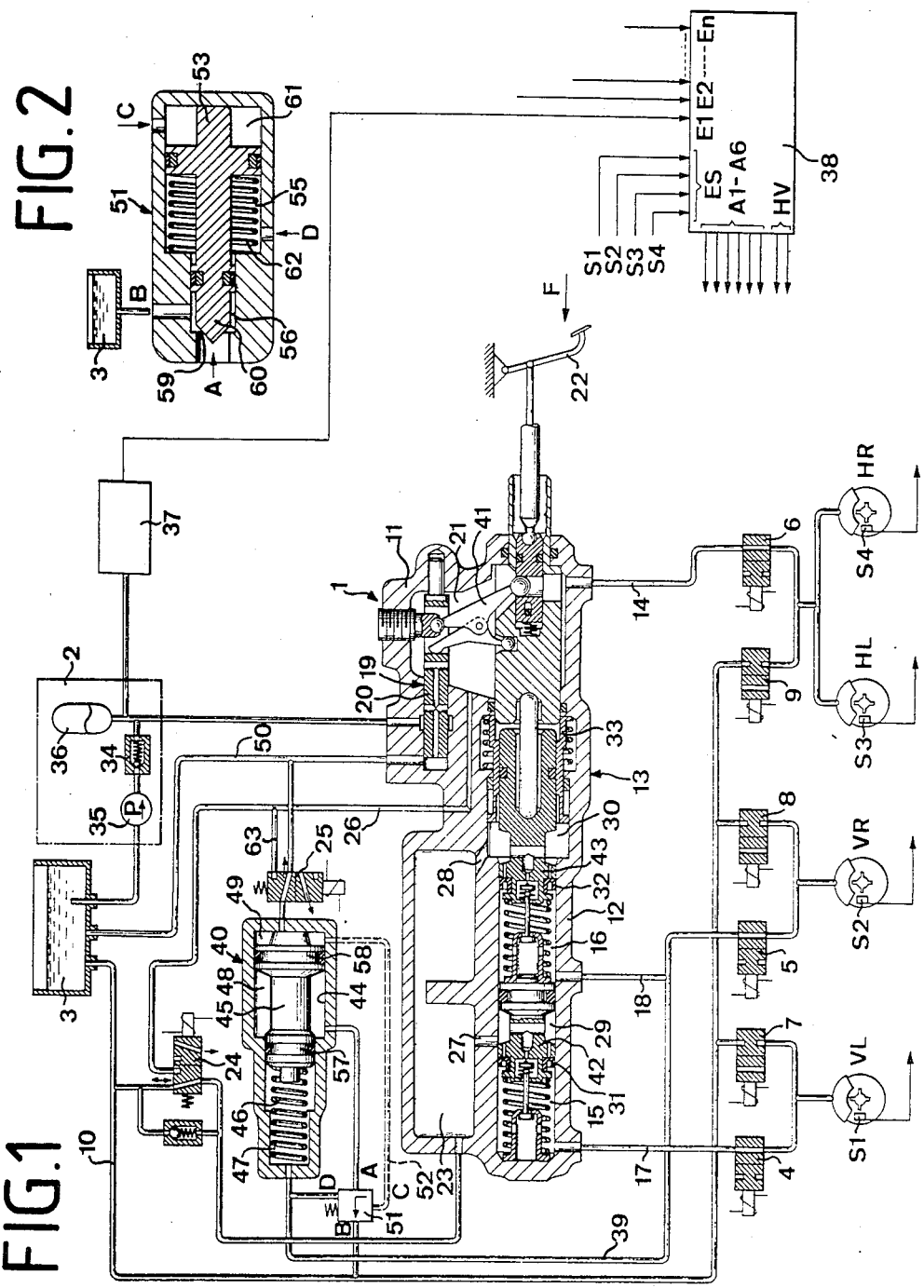

SLIP-CONTROL HYDRAULIC BRAKE BOOSTER WITH BRAKING-PRESSURE RESPONSIVE VALVE FOR FAST-FILL CYLINDER

BACKGROUND OF THE INVENTION

1. Field of the Invention

The present invention relates to a hydraulic brake system for automotive vehicles with a hydraulic power booster and a master cylinder connected downstream of the power booster. The pressure chamber of the power booster is pressurized by auxiliary pressure which is dependent on the position of a pedal actuatable brake valve. An auxiliary cylinder comprising a fast-fill cylinder is provided The fast-fill cylinder is pressurized by the dynamic pressure and with the aid of which the working chamber of the master cylinder can be supplied with additional pressure fluid in the initial phase of braking.

2. Description of the Prior Art

In German application P No. 30 16 683.7, for example, a hydraulic brake system is proposed which comprises a tandem master cylinder with a hydraulic power booster connected upstream thereof. One chamber each of the tandem master cylinder communicates with wheel brake cylinders by way of a brake conduit into which a so-called two-way valve is inserted.

A characteristic of the wheel brake cylinders of recent types of vehicle brakes generally is that they consume a great volume of brake fluid before the pad is applied to the brake disc. Such conventional brake systems, wherein an increase of the braking pressure takes place by means of a hydraulic power booster connected upstream of the master cylinder, therefore have the disadvantage due to the great volume of fluid taken in that the master cylinder pistons have to travel a certain distance before any braking effect is achieved at all. Furthermore, the break-off or non-braking effect in this connection results because the booster piston only starts moving when a relatively high pressure has been reached in the pressure chamber of the hydraulic power booster. The frictional forces of the packing material in the transition from static friction to sliding friction decrease abruptly so that the braking pressure in the working chambers of the master cylinder starts to increase more or less abruptly.

In order to avoid this functional disadvantage the noted German patent application provides for the hydraulically actuatable two-way valves which shut off the brake conduits when the brake is in an inactive position. That is, when the working chambers of the master cylinder are in unpressurized condition, while the two-way valves are additionally connected to the pressure of the hydraulic power booster.

It is a known fact that when a pedal-actuated brake valve of the hydraulic power booster is actuated, first a connection between the pressure chamber and an unpressurized supply reservoir is closed, whereas after a control path beyond that point the pressure supply towards the pressure chamber is at first partially opened. Thus, a relatively low pressure builds up at first in the pressure chamber of the hydraulic power booster, which pressure, though not yet sufficient to set the booster piston in motion, reaches the wheel brake cylinders by way of the two-way valves connected to the pressure chamber. In this system, pressure medium under not more than low pressure is led to the wheel brake cylinders, with the consequence that the wheel brake cylinders overcome the idle movements inherent in the system while taking in a certain fluid volume. By adequate dimensioning of the brake system the idle movements are overcome when the pressure in the pressure chamber is just high enough to set the booster piston in motion. Thus, there is a pressure build-up in the working chambers of the tandem master cylinder Furthermore, the hydraulically actuatable two-way valves according to the known system are designed such that they change over when the pressure in the working chambers of the master cylinder exceeds the pressure in the dynamic brake circuit. At this change-over pressure a free connection between the wheel brake cylinders and the working chambers of the tandem master cylinder is established, whereas the connection between the pressure chamber of the hydraulic power booster and the wheel brake cylinders is interrupted.

In certain applications it is desirable to have a low braking effect achieved at the wheel brakes when the working chambers of the master brake cylinder are still unpressurized. This is advantageous in particular for automotive vehicles with automatic transmission, since such a vehicle can be kept in idle position, even in the drive gear, by applying a relatively low actuating force to the brake pedal.

In the German patent application P No. 32 15 954.4, a hydraulic brake system is known wherein a braking pressure generator is provided for actuating wheel cylinders. The braking pressure generator comprises a hydraulic power booster and a master cylinder connected downstream of the hydraulic power booster. The master cylinder comprises a master cylinder piston with a relatively low diameter, whereas the booster piston has a larger diameter. Inside the booster piston, a brake valve is arranged by means of which a hydraulic pressure is adjustable in the pressure chamber of the hydraulic power booster in dependence of the force applied from time to time to the brake pedal.

Arranged beside the braking pressure generator is an auxiliary cylinder in which a piston is slidably sealingly guided against the force of a pressure spring. The piston guided in the auxiliary cylinder is pressurized at one front surface by the pressure prevailing from time to time in the pressure chamber of the hydraulic power booster, while the chamber accommodating the pressure spring is connected with the working chamber of the master cylinder. Since the piston inside the auxiliary cylinder has a considerably smaller diameter than the diameter of the booster piston, the piston is displace at very low pressures in the pressure chamber of the hydraulic power booster so that a corresponding pre-fill volume is introduced into the brake actuating elements before the booster piston with the master cylinder piston coupled to it is set in motion. Between the pistons of the braking pressure generator an annular chamber is formed in the housing which chamber communicates by way of a corresponding pressure conduit with an unpressurized supply reservoir.

In the described brake system, if certain secondary conditions are met, the piston of the auxiliary cylinder starts moving sooner or later than the booster piston so that the desired pre-fill effect may not be achieved under certain circumstances.

SUMMARY OF THE INVENTION

The object of the present invention therefore is to improve a brake system of the above type with relatively simple structural means in such a way that, on the one hand, the desired pre-fill effect is certain to occur and, on the other hand, an exact synchronization of the movement of the piston of the master cylinder with the stepped piston of the fast-fill cylinder takes place.

This object is achieved according to the present invention by the fact that a chamber between the two piston steps of the fast-fill cylinder is connectable by way of a valve assembly with an unpressurized supply reservoir and that the valve assembly is furnished with the wheel cylinder pressure as a control variable. An advantageous embodiment provides that the valve assembly comprises a valve gate which is normally in open position and can be switched by the pressure prevailing in the pressure chamber of the hydraulic power booster into a closed position. As explained there is provision that the valve gate is pressurizable by the wheel cylinder pressure in opening direction of the valve gate. As an alternative to such an embodiment, however, it could also be provided that the valve gate is influenced by a control variable which is independent of the wheel cylinder pressure.

A particularly simple construction provides that the valve assembly comprises a piston designed as stepped piston of which the step with the lesser diameter is designed as valve closing member and the step with the larger diameter confines two chambers one of which is connected with the wheel cylinder and the other with the pressure chamber of the hydraulic power booster. With a view to cost-effective manufacturing of the device, it is preferably provided that the active surfaces of the larger-diameter step of the piston are of equal size and that in the chamber connected with the wheel cylinder a pressure spring is arranged which pressurizes the valve gate of the valve assembly in opening direction. The pressure spring exerts a control force predetermined by the spring rate on the stepped piston of the valve assembly and on the other hand ensures that the stepped piston of the valve assembly in operation of the vehicle without braking in any case reaches a defined end position. The control force acting upon the stepped piston of the valve assembly can be varied by variation of the force of the pressure spring. For this purpose it is provided that the force of the pressure spring is adjustable.

Expediently, in the pressure fluid path from the booster chamber to the fast-fill cylinder a valve, such as a three-way/two-position directional control valve, is inserted by way of which the pressure chamber of the fast-fill cylinder is connectable to the reservoir. It is advantageous that the fast-fill cylinder comprises three chambers, of which the fill-step chamber is connected directly to the brake circuit, the pressure chamber is connected to the booster chamber, and the control chamber is connected by way of the control valve to the return flow conduit while the valve chamber of the control valve communicates by way of a control conduit with the pressure chamber.

BRIEF DESCRIPTION OF THE DRAWING

Further features, advantages, and possible applications of the present invention can be taken from the following description with reference to the attached drawing wherein:

FIG. 1 illustrates a brake system in accordance with the present invention and,

FIG. 2 is a detailed cross-sectional view of an element symbolically illustrated in FIG. 1.

DETAILED DESCRIPTION OF THE PREFERRED EMBODIMENT

According to FIG. 1, the brake system in accordance with the present invention comprises a pedal-actuated longitudinal hydraulic braking pressure generator which is designated in its entirety with the number 1. The system further comprises an auxiliary pressure source 2, a supply and pressure compensating reservoir 3, and electromagnetically actuatable two-way/two-position directional control valves 4-6 by way of which the wheel brakes (i.e., front and rear wheels VR, VL, HR, and HL) are connected in three hydraulically separated brake circuits. The valves 4-6 are normally (i.e., when de-energized) switched to open passage. Furthermore, return flow conduit 10 is provided leading from the front and rear wheels VR, VL, HR, HL to the compensating reservoir 3. The return flow conduit, however, is separated by three further two-way/two-position directional control valves 7-9 from the wheel brake cylinders as long as the valves 7-9 from the wheel brake cylinders as long as the valves 7-9 are de-energized. The braking pressure generator 1, in turn, is composed of a hydraulic brake power booster 11 and a master cylinder arrangement 12 as well as a positioning device 13.

The rear wheel brake circuit 14, is directly connected to the brake power booster 11 a brake circuit. The two working chambers 15 and 16 of the master cylinder arrangement 12, which is provided as tandem master cylinder, are connected by way of separate brake circuits 17 and 18 each with a front wheel VR or VL. The two master cylinder circuits of this arrangement are designated as static pressure fluid circuits. The rear axle circuit is designated as dynamic pressure fluid circuit, since in this circuit 14 the pressure is determined by the position of a control valve 19 which is pedal-actuated by way of a linkage 41. Depending on the displacement of a valve piston 20, the control valve 19 allows more or less pressure from the auxiliary energy source 2 to flow into the booster chamber 21 and from there into the brake circuit 14.

The pressure built up in the booster chamber 21 upon actuation of a brake pedal 22 or introduced through the control valve 19 acts simultaneously on the pistons 42, 43 of the master cylinder arrangement 12 and leads to braking pressure being built-up in the working chambers 15 and 16 of the two static brake circuits 17, 18 which lead to the front wheels VR and VL. Initially, atmospheric pressure prevails in a prechamber 23 of the master cylinder arrangement 12, because this chamber communicates by way of a so-called main valve 24 in idle position, in which the valve is de-energized, with the pressure compensating reservoir 3.

At each wheel VL, VR, HL, HR of the vehicle equipped with the brake system according to the present invention there is a sensor S1-S4 which is designed, for example, as an inductive sensor and which feeds information about the wheel rotational behavior into an electronic controller 38. The corresponding inputs of the controller 38 are designated as $E_s$. Controller 38 comprises an electronic combining logic in the form of prewired or programmable circuits, such as microprocessors, and upon evaluation of the sensor signals generates control commands which are applied to the outputs $A_1$–$A_6$ and HV and are passed on by way of signal lines (not shown) to the corresponding solenoid valves 4–9, 24, and 25.

In the initial phase of the brake slip control, both valves 24 and 25 are changed over. Thus, a pressure fluid path 26 leading from the booster chamber 21 into the prechamber 23 is opened so that pressure fluid flows into the prechamber 23. Through connecting channels 27, 28 this pressure is passed on to annular chambers 29, 30 within the master cylinder arrangement 12. From these chambers, pressure is dynamically fed by way of sealing collars 31, 32 arranged at the circumference of the pistons 42, 43 having the function of check valves into the working chambers 15, 16 which communicate with the brakes of the front wheels. The dynamically fed-in pressure at the same time causes a positioning sleeve 33 of the positioning device 13 to be reset, which causes the pistons 42, 43 to adopt a defined position within the master cylinder arrangement 12.

By means of the dynamic introduction of pressure fluid into the static circuits of the front wheels VR, VL and into the annular chamber 30 which is responsible for the pressure to reset the positioning sleeve 33, an "empty control" of the working chambers 15 and 17 is precluded even in case of frequent pressure decreases due to pressure fluid flowing off through the changed-over valves 7 and 8.

A fast-fill cylinder 40 is additionally connected by way of a pressure conduit 39 to the brake circuit 18. The fast-fill cylinder comprises a stepped bore 44 in which a stepped piston 45 is arranged in a lengthwise sliding manner against the force of a readjusting spring 46. The stepped piston 45 divides the stepped bore 44 into a fill-step chamber 47, an annular control chamber 48 and a pressure chamber 49. The pressure chamber 49 is connectable by way of a three-way/two-position directional control valve 25 either with the pressure fluid path 26 or a return flow conduit 50. The control chamber 48 is connected to a control valve 51 which is actuatable by way of a control conduit 52 connected with the pressure chamber 49. The control valve, of which a more detailed illustration is shown in FIG. 2, comprises four connecting ports A to D. Control valve 51 establishes the connection between the control chamber 48 and the return flow conduit 10 leading to the reservoir 3, when the controlled pressure has reached the pressure chamber 49 and this pressure is also applied by way of the control conduit 52 to the connecting port C of the control valve 51.

However, the movement of the piston 53 of control valve 51 is also determined at the same time by the pressure prevailing in the fill-step chamber 47 which is connectable by way of the pressure conduit 39 with the brake circuit 18 and/or the working chamber 16 of the master cylinder 12 and which is also connected by way of a branch conduit 54 with the spring chamber 55 of the control valve 51. In unpressurized condition the inlet port A of the control valve 51 is connected with the outlet port B, while the annular chamber 56 is connected with the reservoir 3. When the brake pedal 22 is actuated, pressure is applied to the fill-step chamber 47 and also to the control inlet port C of the control valve 51, since the pressure chamber 49 is also pressurized by controlled pressure from the booster chamber 21 by way of the pressure fluid path 26 and the three-way/two-position directional control valve 25. The passage from A to B of the control valve 51 is now locked until the master cylinder pressure or the pressure in the brake circuit 18 opens the control valve 51 at the control inlet port D and thus a state of equilibrium is established. Hence, as the pressure rises in the booster chamber 21, the volume in the annular chamber 56 is discharged into the reservoir 3 and the fill volume is metered to the brake circuits. When the brake pedal 22 is released, the pressure at the control inlet port C decreases, the connection from A to B is reestablished, and the stepped piston 45 can return to its initial position.

In the event of a defect in the auxiliary pressure supply system 2 (consisting of a pressure fluid pump 35 with appertaining check valve 34 and a pressure fluid reservoir 36) the pressure alarm circuit 37 reacts, feeds the information of this condition to the electric controller 38 of the brake system and, depending on the volume of remaining pressure, leads to a partial standstill or shutoff of the brake slip control. The pressure alarm circuit 37 is necessary in the disclosed embodiment of the present invention, because the auxiliary energy is used also in case of normal braking operation without slip control for boosting the braking power in the static pressure circuits 17, 18 and for generating braking pressure in the dynamic brake circuit 14.

Defects in the dynamic pressure fluid path inside the braking pressure generator 1 (for example, a defect in the booster chamber 21 or in the conduit 26, a leaking main valve 24, or a non-opening main valve 24) however, are detected according to the present invention by measuring the distance traveled by the positioning sleeve 33 or by determining its position. For if a leakage or a defect in the pressure fluid path prevents dynamic pressure from flowing into the annular chamber 30, this will cause a reduction of the volume in the working chambers 15, 16 of the brake slip control and a considerable displacement of the positioning sleeve 33 towards the left, as viewed in the drawing. Finally (as when the remaining pressure fluid volume in the front wheel circuits becomes too low) a switch (not shown) is displaced, opens the signal path, and feeds in a fault signal by way of the input $E_2$ of the electronic controller 38. By way of the outputs $A_1$–$A_6$ and HV which lead to the directional control valves 4–9 and to the valves 24 and 25, the brake system is thus partially or entirely switched off.

What is claimed is:

1. A hydraulic brake system for automotive vehicles comprising a hydraulic power booster and a master cylinder connected downstream of the power booster, wherein the pressure chamber of the power booster is pressurizable by auxiliary pressure which is dependent on the position of a pedal-actuatable brake valve and wherein there is provision of an auxiliary cylinder, which is pressurizable by dynamic pressure and with the aid of which a working chamber of the master cylinder can be supplied with additional pressure fluid in the initial phase of braking, wherein said auxiliary cylinder is a fast-fill cylinder (40) wherein a chamber (48) between two piston steps (57, 58) of the fast-fill cylinder (40) is connectable with an unpressurized supply reservoir (3) by way of a valve assembly (51) and wherein the valve assembly (51) is furnished with the wheel cylinder pressure as a control variable, and wherein the valve assembly (51) comprises a valve gate (59) which is normally in open position and which can be switched by the pressure prevailing in the pressure chamber (21) of the hydraulic power booster (11) into a closed position.

2. The hydraulic brake system as defined in claim 1, wherein the valve gate (59) is pressurizable by the wheel cylinder pressure in opening direction of the valve gate (59).

3. A hydraulic brake system for automotive vehicles comprising a hydraulic power booster and a master cylinder connected downstream of the power booster, wherein the pressure chamber of the power booster is pressurizable by auxiliary pressure which is dependent on the position of a pedal-actuatable brake valve and wherein there is provision of an auxiliary cylinder, which is pressurizable by dynamic pressure and with the aid of which a working chamber of the master cylinder can be supplied with additional pressure fluid in the initial phase of braking, wherein said auxiliary cylinder is a fast-fill cylinder (40) wherein a chamber (48) between two piston steps (57, 58) of the fast-fill cylinder (40) is connectable with an unpressurized supply reservoir (3) by way of a valve assembly (51) and wherein the valve assembly (51) is furnished with the wheel cylinder pressure as a control variable, and wherein the valve assembly (51) comprises a piston (53) designed as stepped piston of which the step with the lesser diameter is designed as valve closing member (60) and the step with the larger diameter confines two chambers (55, 61) one of which is connected with the wheel cylinder and the other with the pressure chamber (21) of the hydraulic power booster (11).

4. The hydraulic brake system as defined in claim 3, wherein the active surfaces of the larger-diameter step of the piston (53) are of equal size and wherein the chamber (55) connected with the wheel cylinder a pressure spring (62) is arranged which pressurizes the valve gate (59) of the valve assembly (51) in the opening direction.

5. The hydraulic brake system as defined in claim 4, wherein a pressure fluid path (26, 63) from the booster chamber (21) to the fast-fill cylinder (40) a three-way/two-position directional control valve (25) is inserted by way of which the pressure chamber (49) of the fast-fill cylinder (40) is connectable to the reservoir (3).

6. The hydraulic brake system as defined in claim 3 wherein the fast-fill cylinder (40) comprises three chambers (47, 48, 49) of which one chamber (47) is connected directly to the brake circuit (18), the second chamber (49) is connected to the booster chamber (21), and the third control chamber (48) is connected by way of the control valve (51) to the return flow conduit (10), while the valve chamber (61) of the control valve (51) communicates by way of a control conduit (52) with the second pressure chamber (49).

* * * * *